United States Patent [19]

Fues et al.

[11] Patent Number: 5,536,430
[45] Date of Patent: Jul. 16, 1996

[54] PROCESS OF PRODUCING LOW-DUST ANIONIC SURFACTANT CONCENTRATES IN POWDER OR GRANULE FORM WITH IMPROVED SOLUBILITY IN AQUEOUS MEDIA

[75] Inventors: Johann Fues, Grevenbroich; Wilfried Raehse, Duesseldorf; Kathleen Paatz, Duesseldorf; Wolfgang Poly, Duesseldorf; Bert Gruber, Bedburg; Andreas Syldath, Duesseldorf; Sven Welper, Essen; Herbert Pattberg, Hilden, all of Germany

[73] Assignee: Henkel Kommanditgesellschaft auf Aktien

[21] Appl. No.: 290,860
[22] PCT Filed: Feb. 9, 1993
[86] PCT No.: PCT/EP93/00302
  § 371 Date: Oct. 12, 1994
  § 102(e) Date: Oct. 12, 1994
[87] PCT Pub. No.: WO93/16165
  PCT Pub. Date: Aug. 19, 1993

[30] Foreign Application Priority Data

Feb. 12, 1992 [DE] Germany ............. 42 04 090.6
Feb. 12, 1992 [DE] Germany ............. 42 04 035.3
Feb. 27, 1992 [DE] Germany ............. 42 06 050.8
Oct. 12, 1992 [DE] Germany ............. 42 34 376.3

[51] Int. Cl.$^6$ ............................. C11D 11/00
[52] U.S. Cl. ............... 510/535; 159/4.4; 159/48.1; 510/536; 510/457; 510/452; 510/443
[58] Field of Search ................... 252/89.1, 174, 252/549, 550, 551, 530, 109; 159/4.4, 48.1, DIG. 10

[56] References Cited

U.S. PATENT DOCUMENTS 3,844,969 10/1974 Griffiths et al. ............. 252/108
4,171,243 10/1979 Brooks et al. ............. 159/48 R
4,828,721  5/1989 Bollier et al. ............. 252/8.7
4,894,117  1/1990 Bianchi et al. ............. 159/49
4,963,226 10/1990 Chamberlain ............. 159/48.1
5,319,117  6/1994 Fabry et al. ............. 554/98

FOREIGN PATENT DOCUMENTS 2412837 10/1974 Germany.
3936001  5/1991 Germany.
3941365  6/1991 Germany.
4030688  4/1992 Germany.
4204090  8/1993 Germany.
4204035  8/1993 Germany.
4234376  4/1994 Germany.
9205849  4/1992 WIPO.

Primary Examiner—Paul Lieberman
Assistant Examiner—Lorna M. Douyon
Attorney, Agent, or Firm—Ernest G. Szoke; Wayne C. Jaeschke; Real J. Grandmaison

[57] ABSTRACT

Anionic surfactant concentrates in the form of solid free-flowing powders and/or granules which may also be present as compounds in admixture with other auxiliaries and/or useful materials suitable for use in detergents and/or cleaning products and which have apparent densities of at least about 150 g/l are produced by hot drying of the water-containing preparations with superheated steam as the drying gas. Preferred apparent densities are above about 200 g/l and are preferably at least about 350 g/l. In addition, the pourable and free-flowing material is preferably in the form of a substantially dust-free material through the presence of dust-binding auxiliaries and/or useful materials and/or by regulation of the residual water content. In one preferred embodiment, the anionic surfactant concentrate is in the form of porous carrier beads with an absorbent porous inner structure.

5 Claims, No Drawings

PROCESS OF PRODUCING LOW-DUST ANIONIC SURFACTANT CONCENTRATES IN POWDER OR GRANULE FORM WITH IMPROVED SOLUBILITY IN AQUEOUS MEDIA

This invention relates to a new form of presentation of washing- and/or cleaning-active anionic surfactant concentrates as dust-free, solid, free-flowing powders and/or granules. More particularly, the problem addressed by the invention was to make washing- and/or cleaning-active anionic surfactant compounds available in a form in which they had not previously been available with this combination of properties. More particularly, the invention sought to provide fine-particle powders and/or granules adjustable as required in their anionic surfactant content (which was intended to extend virtually to the pure surfactant or surfactant mixture) which would be distinguished by the substantial or complete absence of dust, would have high and adjustable apparent densities distinctly in excess of 150 g/l and, at the same time, would show optimized dissolving behavior in aqueous washing and/or cleaning liquors.

In one important embodiment, the invention sought to provide anionic surfactants and/or mixtures of anionic surfactants which would be distinguished by their availability in virtually any quantities but, at the same time, by relatively low production costs, would optimally satisfy the stringent requirements which ecologically safe surfactants or surfactant components are now having to meet and, hence, would be capable of making a significant contribution towards the now desirable replacement of anionic surfactants based on alkylbenzene sulfonates.

In particular embodiments, the problem addressed by the invention was to make known anionic surfactants available from starting materials of vegetable and/or animal origin as principal components of the new dust-free anionic surfactant concentrates. However, the invention is not confined to these starting materials of vegetable and/or animal origin. Surfactant compounds of synthetic origin, more particularly ecologically safe compounds of synthetic origin, are preferred main components and/or mixture components in the context of the teaching according to the invention.

The difficulties involved in solving the problems addressed by the invention are illustrated by way of example hereinafter with reference to the following situation: several ecologically safe anionic surfactant components available in sufficient quantities and at reasonable cost from the field of sulfates and/or sulfonates of oleophilic organic components, such as fatty acids, fatty alcohols, sufficiently long-chain olefins and/or alkanes and the like, are known to experts on detergents and/or cleaning products. Typical examples are the class of semiesters of sulfuric acid with fatty alcohols, more particularly relatively long-chain saturated fatty alcohols, which play an important part under the name of fatty alcohol sulfates (FAS), and fatty alcohol ether sulfates (FAES) derived therefrom by alkoxylation, more particularly ethoxylation and/or propoxylation, of fatty alcohols and subsequent sulfation of the alcohol components thus formed.

Other important representatives of typical anionic surfactants belong to the class of sulfonated fatty acids and washing-active salts thereof and also the associated sulfonated fatty acid esters. Known surfactants from the class just mentioned are the $\alpha$-sulfofatty acid methyl esters and their salts (MES) and the $\alpha$-sulfonated carboxylic acids derived therefrom by ester cleavage and/or direct $\alpha$-sulfonation of fatty acids and the washing-active salts of these carboxylic acids which are known as "disalts". All the anionic surfactant compounds listed above purely by way of example contain relatively long-chain organic residues, for example in the $C_{8-24}$ and, more particularly, in the $C_{12-18}$ range, and are known mixture components in detergents in which they are normally used with other surfactants, particularly nonionic surfactants, organic and/or inorganic builders or builder components and other typical mixture components.

Hitherto, considerable difficulties have always been involved in making anionic surfactant concentrates of the type in question—and also synthetic anionic surfactants of the ABS type—available in the form of solid free-flowing and, more particularly, dust-free powders and/or granules which combine a high apparent density with the high and rapid solubility in aqueous liquors required in practice. Presentation in the form of dust-free, pourable and free-flowing, quick-dissolving fine powders or granules would be the ideal solution for the broad application of, for example, sulfate- and/or sulfonate-based anionic surfactants of the vegetable and/or animal origin. The aqueous pastes often obtained as primary reaction products in the production of the anionic surfactant compounds in question present many problems in regard to industrial processing both for reasons of stability and because of the difficulties involved in handling pastes. On the one hand, alkyl sulfate pastes are vulnerable to hydrolysis while, on the other hand, all anionic surfactant pastes vary considerably in their viscosity in dependence upon the solids content of the particular water-containing paste to the point where the water-containing pastes become impossible to transport through pumps and pipes and, for example, cannot be dosed.

Against this background, it is not surprising that numerous proposals have been put forward with a view to converting anionic surfactants of the type with which the invention is concerned into the form of solids. More particularly, compounds containing the anionic surfactants in admixture with dispersants, solubilizers and/or readily water-soluble salts have been proposed. Auxiliaries of this type have to be used in the production of dry products in accordance with the prior art because conventional drying technology based on hot drying in spray drying towers and/or in fluidized beds would lead to anionic surfactant products of limited value. Difficulties lie in particular in the following situation: the poor solubility of important surfactant components and their tendency to gel, even if they are converted into a fine-particle dry state, leads to relatively slow-dissolving dry powders. The production of dry powders of this type in spray drying towers, for example, leads to powders with, in some cases, extremely high dust emission levels, even where only moderate contents of anionic surfactant are present in the starting material. This gives rise to secondary problems on a considerable scale; for example, breathing masks have to be worn in the production and handling of these dry powders.

In addition, a particular difficulty lies in the following phenomenon: anionic surfactant compounds of the described type can only be worked up into powder products of low apparent density by the hitherto known drying technology in hot air or in hot waste gases in modern spray drying technology. Even the use of auxiliaries, for example inorganic salts as wetting agents, produces only a limited increase in the apparent densities of the dry surfactant powder. In many cases, the apparent densities are below 100 g/l. In attempts to optimize the process, apparent densities of at most about 130 g/l can be adjusted, for example, in the case of the dry powders based on TAS (tallow alcohol sulfate). Even in admixture with auxiliaries, disalts of the type described above definitely cannot be produced as dry powders with apparent densities of this order. In their case, the apparent densities which can be achieved on an industrial scale are generally far below 100 g/l.

DISCUSSION OF RELATED ART

In their earlier application DE-A 40 30 688, applicants describe a process for the recovery of fine-particle solid, pourable or free-flowing useful materials or mixtures of useful materials for wetting agents, detergents and/or cleaning products from aqueous preparations thereof using superheated steam as the drying hot gas stream, drying of the particulate material being terminated before it is endangered by heat. If necessary, the long-term pourability or free flow of the material thus partly dried is ensured by addition of mixture constituents which are capable of binding limited quantities of water.

Simplified and improved processes for drying useful materials for detergents and/or cleaning products with superheated steam are described in applicants' earlier German patent applications DE-A 42 04 035 and DE-A 42 04 090. The teaching of the present invention described hereinafter goes on from the disclosures of these earlier German patent applications. Accordingly, the teaching of these earlier applications is also specifically included herein as part of the disclosure of the present invention.

DESCRIPTION OF THE INVENTION

The present invention relates to the anionic surfactant concentrates described hereinafter in the form of solid free-flowing powders and/or granules which may also be present as compounds in admixture with other auxiliaries and/or useful materials suitable for use in detergents and/or cleaning products and which have been produced by the drying of corresponding water-based preparations to form the powders and/or granules.

According to a first embodiment of the invention, the anionic surfactant concentrates are characterized in that they contain the anionic surfactant compounds at least partly in the form of their washing- and/or cleaning-active salts, have apparent densities of at least 150 g/l and have been produced by hot drying of the water-containing preparations with superheated steam as the drying gas. Preferred apparent densities of the anionic surfactant concentrates are of the order of 200 g/l or higher, preferably of the order of 300 g/l or higher and, more preferably, of the order of at least 350 g/l.

In addition, the anionic surfactant concentrates according to the invention are distinguished in particular by the fact that they are at least of low dust content and, in the preferred embodiment, are almost completely free from dust. In one preferred embodiment, they are characterized in that, to establish these properties, even in a very fine-particle material, they contain dust-binding auxiliaries and/or useful materials as mixture constituents. In addition to or instead of this measure, freedom from dust can also be established in accordance with the invention by regulation of the residual water content in the pourable and free-flowing material.

In another important embodiment of the invention, the invention relates to anionic surfactant concentrates in the form of a pourable granular material, hereinafter also referred to as "carrier beads", which is distinguished by an absorbent porous inner structure of the granular carrier beads.

In another embodiment, the invention relates to a process for the production of the anionic surfactant concentrates with the desired combination of properties as described in the foregoing. Finally, in another embodiment, the invention relates to the use of the anionic surfactant concentrates in dry form in detergents and/or cleaning products, above all water-based types, more particularly for at least partly replacing ABS-based anionic surfactants.

DETAILED DESCRIPTION OF THE INVENTION

It has surprisingly been found that it is possible by keeping to the combination of elements defined in accordance with the invention and, optionally, taking into account the additional elements described in the following to provide or produce solid anionic surfactants and corresponding anionic surfactant concentrates with the desired combination of properties which, although sought after by experts for decades, have never previously been accomplished in this particular combination. The anionic surfactants may be produced in the form of very fine powders by spray drying. The powders obtained are as free from dust as the surfactant granules which, hitherto, had been regarded as virtually the only solution and of which the production by old methods from powders produced beforehand involved an additional step. The anionic surfactant powders according to the invention are also distinguished by high apparent densities which make the handling, packaging and transport of this particular form of presentation both appropriate and economically acceptable. At the same time, the high apparent densities obtainable are important for directly useable mixture components for the desired production of dry forms of presentation of detergents and cleaning products as so-called heavy powders. However, experience acquired with the old technology suggests that a form of presentation such as this for the anionic surfactant solids should be attended by the disadvantage of complicated or at least delayed solubility in aqueous liquors. According to the invention, this disadvantage no longer exists or is reduced to at least such an extent that there are no longer any limitations in regard to the practical handling and application of the anionic surfactant concentrates according to the invention.

In one preferred embodiment, the content of washing- or cleaning-active surfactants in the anionic surfactant concentrates according to the invention is at least about 20% by weight and preferably of the order of at least 30% by weight (based on fine-particle solids). Basically, the surfactant solid as such may form the powder particles or granules. In practice, however, it is important to bear in mind the fact that, in general, limited quantities of residual components (inorganic salts, non-sulfonated residues and the like) are present as acceptable or rather irrelevant impurities in the surfactant solids from the production of the anionic surfactants on an industrial scale. According to the invention, therefore, surfactant granules having an active content of anionic surfactants in the range from about 35 to 95% by weight are particularly preferred. Within this range, those substances or mixtures of substances in which the surfactant components make up more than 50% by weight (based as before on fine-particle solids) may be preferred. In accordance with the particular mixture of useful materials to be obtained, preferred upper limits to the anionic surfactant content are approximately 75 to 95% by weight, i.e. for example approximately 80, 85 or 90% by weight anionic surfactant. Other determining factors in this regard can be the basic principles of drying with superheated steam as the drying gas which are discussed in applicants' earlier applications cited above, more particularly in DE-A 40 30 688, and which are briefly recalled in the following to enable the present invention to be better understood.

It is known that, where superheated steam is used as the drying medium, the temperature profile in the drop of material to be dried differs from conventional drying processes using hot air and/or hot fuel gases in the following respect: when the material to be dried is introduced with temperatures below 100° C. into the superheated steam atmosphere, the water-containing drop is spontaneously heated to the boiling temperature of the water under the operating conditions through condensation of the superheated steam on the relatively cool starting material and release of the heat of condensation to the material to be dried. Accordingly, where drying is carried out under normal pressure, this means that the drop of material is heated to around 100° C. This boiling temperature is maintained as a minimum temperature in the drop of material over the entire drying period. Depending on the melting temperature of the particular anionic surfactant or mixture of anionic surfactants used, it can be useful or may even be necessary to use auxiliaries which are solid at temperatures of 100° C. and hence guarantee the long-termpourability and flowability of the granular material thus dried. As explained in the following, these auxiliaries may in turn be selected useful materials for the proposed application or inert materials. They may be based on organic and/or inorganic mixture components and may be soluble and/or insoluble in water. In spray drying, this safeguards the result known from conventional spray drying that the fluid, wet starting material can be dried in fine particle form without the particles adhering significantly to one another or at least with controllable adjustment of the particle size, even where superheated steam is used the drying gas.

The anionic surfactant components present in these solids may be certain individual useful materials of the type mentioned, although virtually any mixtures of useful materials from the class of surfactants under discussion may also be present. The expression "surfactant mixture" may be interpreted in various ways: even within a selected class, for example fatty alcohol sulfates and/or fatty acid sulfonates, there is generally no individualized substance in the sense of a selected compound. The processing of the starting materials of vegetable and/or animal origin and the processing of corresponding synthetic starting chemicals leads to useful materials of the type in question which fall within a certain band in their composition, for example regarding the number of carbon atoms in the fatty alcohol and/or fatty acid components.

However, the expression "surfactant mixtures" in the context of the definition according to the invention also encompasses the specific combination of anionic surfactants of basically different structure. Thus, it may be useful, for example, to blend conventional washing-active TAS-based anionic surfactants with anionic surfactant dispersants which may be based, for example, on comparatively short-chain sulfates and/or sulfonates. Other examples of at least two different types of anionic surfactant are mixtures of, on the one hand, disalts, i.e. α-sulfofatty acid salts, for example having a chain length of $C_{14}$ to $C_{20}$, and on the other hand anionic surfactants based on fatty alcohol sulfates, for example TAS, and/or on alkyl ether sulfonates, particularly methyl ester sulfonates (MES).

The invention solves the problem of providing dust-free powders and/or granules in two ways which may even be used in combination with one another. The first is based on the proposal of making specific use of the residual water content of the material to be dried. Depending on the quality of the particular solid material present, freedom from dust can be at least largely established by regulating the water content of the dry material.

The figures from the disclosure of DE-A 40 30 688 cited at the beginning and included as part of the disclosure of the present invention are of relevance in this regard. Preferred residual water contents are in the range from about 1 to 20% by weight, preferably at most about 10% by weight and, more particularly, below 5 to 7% by weight. Residual water contents of 3 or 4% by weight can be particularly suitable, residual water contents of about 1 to 3% by weight generally giving satisfactory results. As the Examples show, however, residual moisture contents below 1% by weight can also be established.

In one important embodiment of the invention, however, the anionic surfactant concentrates may contain added components in varying amounts which should primarily be regarded in the context of the problem addressed by the invention of eliminating dust formation, i.e. as dust-binding auxiliaries. In this embodiment, however, the invention specifically encompasses the incorporation of these auxiliaries which, in turn, represent useful materials for use in detergents and/or cleaning products in conjunction with the particular anionic surfactant components in question.

In this embodiment, the fine-particle, pourable and free-flowing anionic surfactants according to the invention are characterized in that they contain as the dust-binding auxiliaries and/or useful materials mixture components—preferably in the form of a homogeneous mixture—which are liquid and/or at least tacky at room temperature, optionally in the presence of limited quantities of residual water, and which are preferably incorporated in the surfactant concentrate in such quantities that the necessary freedom from dust is guaranteed without a lasting adverse effect on pourability and free flow.

Suitable dust-binding auxiliaries are, in particular, mixture components in the form of monomer compounds, oligomer compounds and/or suitably selected polymer compounds which, in particular, are soluble, emulsifiable and/or swellable in water at room temperature. Before characteristic examples of such auxiliaries or useful materials as mixture components are discussed, the concept on which the teaching according to the invention is based in this regard will be explained: by virtue of their solubility or emulsifiability in water and, in any event, by virtue of their swellability in water, the auxiliaries may be homogeneously incorporated in the mixture of active substances based on anionic surfactants to be dried. If, in the subsequent drying step using superheated steam from applicants' earlier applications cited at the beginning and to complete the disclosure of the present invention, the water-containing starting material is then dispersed in the superheated steam in the form of particles, more particularly fine particles, and dried under the effect of the superheated steam, the dust-binding auxiliaries are reliably and uniformly incorporated in uniform distribution in each particle. By virtue of the liquid, viscous or at least tacky consistency of the auxiliary, the dust-binding effect of the additive in question comes to the fore in the ultimately dried particles. On the other hand, by suitably selecting the quantities in the mixture of active substances used, it is possible to ensure that the desired state of tack-free pourability or free flow remains intact, even over prolonged periods of storage. The mixing ratios to be established in each particular case can readily be determined by simple tests taking relevant specialist knowledge into consideration.

Characteristic representatives of the dust-binding auxiliaries or useful materials suitable for mixing with the anionic surfactant components are mentioned in the following:

Suitable water-soluble components fluid under normal conditions are polyhydric alcohols of low volatility and oligomers thereof. For reasons of cost alone, glycerol and corresponding oligoglycerols are particularly important in this regard. Such mixture components as oligomers and/or polymers of ethylene glycol and/or propylene glycol are further examples of corresponding compounds which are capable of flowing freely and/or at least of imparting sufficient tackiness under the effect of residual water. More particularly, polyethylene glycols, for example having a molecular weight of up to about 10,000 and preferably up to about 7,000, and especially corresponding oligo compounds having upper molecular weight limits of about 500 to 1,000 can be useful materials in the context of the teaching according to the invention which—in the same way as the above-mentioned representatives glycerol and/or oligoglycerol—not only have the desired dust-binding effect, they also act as solubilizers and/or useful materials for detergents and cleaning products. However, other typical representatives of suitable auxiliaries are mono- and/or oligoglycosides such as, for example, glucose, oligoglucoses, sugars, such as sucrose, or corresponding sugars or sugar compounds encompassing larger numbers of rings up to corresponding polymer compounds of the starch and/or partly degraded starch and starch derivative type. All compounds of this type are distinguished by more or less pronounced tackiness, particularly in the presence of small quantities of water. In the practical application of the detergents and cleaning products, these components which are present in low concentrations are directly absorbed by the aqueous wash liquors and do not interfere with the desired washing and cleaning processes.

In this connection, attention is drawn to another possibility of the presentation of the anionic surfactant compounds under discussion: selected glycoside derivatives are acquiring increasing significance as washing-active compounds, being distinguished in particular by their natural material base. They belong to the classes of alkyl polyglycoside compounds (APG) and esters or partial esters of glycosides, sugars and the like with preferably relatively long-chain fatty acids. Glycoside compounds of the type in question have a pronounced nonionic surfactant character. They are also distinguished by pronounced performance-enhancing synergisms in admixture with anionic surfactants. Despite their substitution by washing- or cleaning-active hydrogen carbon radicals, for example $C_{8-20}$ and, more particularly, $C_{10-18}$ hydrocarbon radicals, glycoside compounds of the type in question here as solids are generally hygroscopic to such an extent that, during homogeneous incorporation in the anionic surfactant useful materials and during the drying of corresponding aqueous slurries, they are capable of additionally performing the function of reliably binding powder-form constituents. The resulting versatility in the increase of the value of a corresponding anionic surfactant/nonionic surfactant mixture requires no further explanation.

Other suitable mixture components for reliable elimination of the dust problem are oligomeric and/or polymeric mixture components which, in turn, are preferably at least swellable and/or even soluble in water. In this case, too, there are a large number of representatives of such components to which considerable significance is attributed in the context of standard detergents and cleaning products. Examples are polyvinyl pyrrolidone (PVP), polyvinyl alcohol (PVA), polycarboxylate compounds, more particularly of synthetic origin, which may be obtained for example by polymerization or copolymerization of (meth)acrylic acid and maleic acid or maleic anhydride and which play an important role as so-called builder components in modern laundry detergents. Another important example of the last-mentioned class of compounds are carboxyfunctional oligoor polyglycoses which may be obtained by selective oxidation of starch with introduction of the carboxyl group in the 6 position of the glucose ring. Also suitable are corresponding water-soluble and/or water-swellable cellulose derivatives, such as methyl cellulose, carboxymethyl cellulose, hydroxyalkyl celluloses, such as hydroxyethyl cellulose and the like.

The representatives mentioned thus far purely by way of example may be complemented and/or replaced by any other mixture components having the stated properties, more particularly adequate solubility or swellability in water and adequate non-volatility under the working-up conditions in superheated steam. Relevant specialist knowledge may be applied in this regard also.

A certain other class of auxiliaries is separately discussed in the following: other suitable mixture components are, in particular, nonionic surfactants which flow freely or are sufficiently tacky under normal temperature conditions but which cannot be assigned to the above-described nonionic surfactants based on glycoside ethers or esters. The class of fatty alcohol ethoxylates containing for example 2 to 40 EO units and, more particularly, 2 to 20 EO units in the molecule and corresponding ethoxylates of fatty acids, fatty amines, carboxylic acid amides and/or alkanesulfonamides are mentioned purely by way of example. The special teaching of applicants' DE 40 30 688 mentioned at the beginning names many important subclasses and special types as examples of such nonionic surfactant components in connection with the drying process disclosed therein using superheated steam. The teaching of the present invention goes beyond the disclosure of the earlier application by using suitable nonionic surfactant components with sufficient free flow or tackiness in the presence of residual water for safely binding unwanted dust in the end product and, at the same time, enabling the anionic surfactants hitherto accessible solely as high-dust preparations in the form of fine powders to be made available in high solids concentrations.

Suitable anionic surfactant compounds are washing- and/or cleaning-active representatives of this class such as are currently available on a broad basis. As already mentioned, materials based on natural substances are as suitable as corresponding synthetic products. Preferred anionic surfactants are distinguished by increased ecological safeness and are particularly suitable for partly and/or completely replacing the ABS-based anionic surfactant component.

Particularly important anionic surfactant compounds for the teaching of the invention are fatty alcohol sulfates (saturated and/or unsaturated), fatty alcohol ether sulfates, olefin and/or alkane sulfonates, fatty acid ester sulfonates, sulfonated fatty acid triglycerides and/or glycerol fatty acid partial ester sulfates. Another important example of anionic surfactants in the context of the teaching according to the invention are succinic acid semiester sulfonates of which the ester group contains a sufficiently oleophilic residue, for example a $C_{6-20}$ and, more particularly, $C_{10-16}$ fatty alcohol radical. Particularly important representatives of the fatty acid ester sulfonates are the known anionic surfactants based on α-sulfofatty acid lower alkyl esters or salts thereof, of which the most important representatives are again the α-sulfofatty acid methyl esters (MES). Characteristic representatives of fatty acid sulfonates are α-sulfofatty acids and washing- or cleaning-active salts thereof which are known among experts as "disalts" and which can be obtained from free fatty acids and/or from corresponding α-sulfofatty acid esters by ester cleavage. Sulfonated fatty acid triglycerides are known to be reaction products of natural fats and/or oils with, in particular, $SO_3$ which are obtained as multicomponent mixtures of sulfates and sulfonates and which are described, for example, in applicants' German patent applications DE-A 39 36 001 and 39 41 365.

The washing- and/or cleaning-active anionic surfactants are typically present in the form of their alkali metal and/or ammonium salts or as soluble salts of organic bases. The sodium salts and corresponding potassium salts are particularly important alkali metal salts. Auxiliaries optionally used are normally present in quantities of at least 2 to 3% by weight and preferably in quantities of at least 5 to 10% by weight, based on the multicomponent mixture.

The teaching of the invention encompasses the mixture of anionic surfactant compounds and mixtures thereof with the mixture components, particularly organic components, listed in the foregoing, even in admixture with inorganic mixture components. The components in question are preferably corresponding components selected from typical constituents of detergents and/or cleaning products which are also homogeneously incorporated in the powders and/or granules. Examples of such water-soluble inorganic mixture components are water-soluble salts, such as sodium carbonate, sodium bicarbonate and/or sodium sulfate and also water-soluble sodium silicates, more particularly the waterglasses typical of detergents and cleaning products. In addition to or instead of these water-soluble inorganic components, water-insoluble mixture components may be incorporated in the powder-form anionic surfactant agglomerates. Examples of water-insoluble mixture components are synthetic zeolite compounds, more particularly detergent-quality zeolite NaA which has a calcium binding power of 100 to 200 mg CaO/g, as determined in accordance with DE 24 12 837. The special quality of anionic surfactant concentrates compounded in accordance with the invention is illustrated precisely by the use of these insoluble inorganic constituents: if, for example, tallow alcohol sulfate (TAS) is subjected together with zeolite NaA to a conventional spray drying process, the washing-active TAS component is absorbed in such a compact, thin layer onto the zeolite particles that, in subsequent application, washing power can no longer be developed to anywhere near its full extent in the wash liquor. In the anionic surfactant concentrates defined in accordance with the invention and produced in accordance with the teaching of the invention, this negative effect of adding zeolite is non-existent or at least greatly reduced. Further examples of possible water-insoluble mixture components are fine-particle swellable layer silicates of the montmorillonite type, for example bentonite. The general rule mentioned in DE-A 40 30 688 repeatedly cited in the foregoing, under which useful materials or combinations of useful materials and auxiliaries which are not damaged significantly, if at all, by brief exposure to water or steam at a temperature of 100° to 110° C. are suitable, also naturally applies in principle to the useful materials and auxiliaries to be used in accordance with the present invention. Components of this type which are not damaged by exposure to temperatures in the range mentioned for at least about 0.5 to 1 min. under the working conditions are particularly suitable useful materials. For example, even surfactant compounds basically vulnerable to hydrolysis are capable of withstanding residence times of a few minutes under these working conditions largely without damage providing certain boundary conditions familiar to the relevant expert are observed. Thus, water-containing preparations of anionic surfactants basically vulnerable to hydrolysis, such as FAS and/or MES, can be worked up into dust-free dry powders by the process according to the invention.

The particularly important embodiment of the invention mentioned at the beginning, in which the anionic surfactant concentrates are in the form of a pourable, free-flowing material with an absorbent porous inner structure, resorts to the principles described in applicants' German patent application P 42 34 376.3. Accordingly, the disclosure of this German patent application is hereby specifically included as part of the disclosure of the present invention. The claimed anionic surfactant concentrates according to the invention therefore also encompass above all corresponding active-substance preparations in the form of porous carrier beads for the production of solid wetting agents, detergents and/or cleaning products which are characterized in that they have an absorbent porous inner structure, of which at least about 35% by weight (% by weight, based on porous carrier beads) consist of anionic surfactants, and have been produced by spray drying and/or fluidized bed drying in superheated steam.

The porous carrier beads containing anionic surfactants in high concentrations are particularly suitable for direct use in wetting agents, detergents and/or cleaning products or may even be initially used for charging the basic particle with useful materials from the field in question, i.e. for example other surface-active components. Corresponding particulars are the subject of the disclosure of applicants' above-cited German patent application P 42 34 376.3.

In a particularly important embodiment of the carrier beads according to the invention, the carrier beads have a microporous inner structure with anionic surfactant contents in their uncharged state of at least about 50% by weight, the anionic surfactant content making up 70, 80 or even as much as 90 to 95% by weight of the carrier beads. Special cases in which the carrier beads can be formed almost completely by the surface-active component by choosing the correct anionic surfactant are described in the following.

According to the invention, another preferred rule is that the dried carrier beads are present as solids at temperatures of about 100° to 110° C. and preferably at temperatures of up to about 120° C., their plasticity and surface tackiness being limited by a suitable choice and composition of the components forming the carrier beads to such an extent that there is no significant adhesion of the particles to one another and/or within their open-pored inner structure, even under the conditions of exposure to the superheated steam. Accordingly, the teaching according to the invention ensures that the special highly porous structure of the dried material initially accumulating during drying with superheated steam is fixed to such an extent that it remains intact under the compressive forces and various forms of contact to which granules of the type in question are inevitably exposed, even at elevated temperatures and optionally in the presence of superheated steam.

The higher the content of surface-active component in the carrier beads, the more pronounced are the individual properties of the surfactant used in the behavior of the porous carrier beads. So far as the teaching according to the invention is concerned, this means that surfactant components sufficiently solid at temperatures in the range from about 100° to 120° C. are preferred materials. In preferred embodiments of the present invention, these anionic surfactant concentrates are mixtures with water-soluble and/or fine-particle water-insoluble inorganic and/or organic auxiliaries and/or useful materials which are selected to ensure the limitation of plasticity and/or surface tackiness at temperatures of 100° to 120° C. which is crucial to the invention. In preferred embodiments of the invention, these mixture components are present in small quantities, based on the anionic surfactants in the carrier beads. Accordingly, the invention provides access for the first time to solid, dry preparations of useful materials from the field of wetting agents, detergents and cleaning products in which solid carrier beads are based at least predominantly on surface-active components and, more particularly, on anionic surfactants. No such preparations are known in conventional detergent technology.

The temperature behavior of the components forming the carrier beads and, more particularly, the behavior of the surface-active components used in the preferred embodiment of the invention at temperatures in the range from about 100° to 120° C. has a critical bearing on the particular composition to be selected for the useful materials and auxiliaries involved in the formation of the carrier beads. Although important anionic surfactants, for example fatty alcohol sulfates (FAS) of long-chain fatty alcohols, a number of washing-active sulfonates and also nonionic surfactants, for example alkyl glycoside compounds of long-chain fatty alcohols, are stable as solids in the temperature range in question, their plasticity and, in particular, their surface tackiness may already have undergone a fairly significant increase. For starting materials of this type, it is intended in accordance with the invention to make those constituents which, thermally, are not entirely satisfactory fully usable for the carrier beads by using mixture components which guarantee the required thermal stability and, in particular, the required low values for surface tackiness and plasticity. These mixture components may be useful materials in the context of conventional detergent mixtures and also auxiliaries which, although having no function of their own in the intended application, do not interfere with the use of the useful materials prepared in accordance with the invention or combinations thereof. The auxiliaries in question may be soluble and/or insoluble in water and may be inorganic and/or organic in character. Where the compounds in question are insoluble in water, fine-particle inorganic and/or organic auxiliaries are normally used. The following observations are made purely by way of example:

INORGANIC/ORGANIC AUXILIARIES

Suitable water-soluble inorganic auxiliaries for reducing the surface tackiness and plasticity of organic components are salts, such as phosphates, particularly STP, sodium sulfate or sodium carbonate. However, the same function can also be performed by soluble sodium silicates of the waterglass and/or alkali metal hydroxide type. Insoluble inorganic mixture components for stabilizing the consistency of the carrier beads and reducing their surface tackiness are, for example, builder components based on zeolite, more particularly detergent-quality zeolite NaA, other swellable or non-swellable layer silicates, for example corresponding montmorillonites, such as bentonite, and the like. However, other builder components based on solid, more particularly crystalline, silicate compounds, which are known in modern detergent technology, are also suitable.

Corresponding auxiliaries can be found among organic components. For example, salts of low molecular weight organic components in sufficiently dried form are generally non-tacky components, even at elevated temperature. Corresponding organic builders, such as the alkali metal salts of polycarboxylic acids, for example citric acid, adipic acid, succinic acid, nitrilotriacetic acid and the like, are suitable non-tacky components. However, organic polymers of the type typically used in detergents, for example corresponding components based on cellulose derivatives and/or PVP, or even inert organic polymer materials, such as cellulose powder and the like, are also suitable as auxiliaries for stabilizing the carrier beads, even at high temperatures.

Basically, suitable mixtures and mixing ratios may be determined in preliminary tests conducted by methods familiar to the expert. After the preliminary tests in question have been carried out, the mixtures selected may be subjected to spray drying from water-containing preparations in superheated steam. In the subsequent treatment with a free-flowing phase, the dry granules formed show whether and to what extent the required finely porous structure and, hence, the chargeability of the carrier beads formed, even in their inner structure, have been developed.

It is crucial to the understanding of the teaching according to the invention that anionic surfactants of synthetic and/or natural origin, such as are typically used in modern wetting agents, detergents and cleaning products, can be converted by the use of generally limited quantities of auxiliaries into sufficiently heat-stable and non-tacky solids and, hence, worked up into porous carrier beads with an open-pore inner structure. In this way, it is possible for the first time to provide porous carrier beads formed predominantly by anionic surfactants for absorbing other detergent ingredients.

In special cases, it is even possible to form the porous carrier beads from the anionic surfactant without using any auxiliaries. One such case are the so-called disalts which are known to be salts, preferably alkali metal salts, of washing-active alpha-sulfonated sulfofatty acids. Disalts or disalt mixtures of technical purity can not only be worked up into porous carrier beads without the addition of further auxiliary components, they may themselves be auxiliaries for thermally less stable anionic surfactant components, such as FAS, FAES, MES, ABS and the like.

In one preferred embodiment of the invention, the porous carrier beads are basically formed using anionic surfactants from the classes of carboxylates, sulfonates, including ester sulfonates, disalts and/or sulfates. Particularly important anionic surfactant components for the production of the carrier beads are alkyl benzene-sulfonates (ABS), fatty alcohol sulfates (FAS), fatty alcohol ether sulfates (FAES), alpha-methylester sulfonates (MES) and/or disalts. The carrier beads may contain selected anionic surfactants or mixtures of several anionic surfactants which are generally made up in admixture with water-soluble and/or fine-particle water-insoluble, inorganic and/or organic, non-surface-active auxiliaries and/or useful materials. In this particular embodiment of the invention, the content of inorganic and/or organic auxiliaries in the carrier beads preferably does not exceed 60% by weight and, more preferably, is in the range from about 5 to 50% by weight, quantities of these auxiliaries for sufficiently stabilizing the anionic surfactants, even at temperatures in the range from about 100° to 120° C., in the range from about 10 to 30% by weight being particularly preferred. All these percentages by weight are based on the uncharged dried carrier beads.

In other important embodiments of the invention, the anionic surfactants are present in the basic structure of the carrier beads in admixture with other sufficiently thermally stable useful materials from the field of wetting agents, detergents and/or cleaning products. In another important embodiment, however, components capable of improving the dissolution of the anionic surfactants in aqueous phases are also particularly suitable for use as additives. Examples of such components are typical dispersants, hydrotropes, structure breakers and the like.

The teaching of the invention also specifically encompasses the porous and uncharged carrier beads made up in the certain manner described above with a content of useful materials and optionally auxiliaries from the field of application mentioned coupled with improved solubility in water. In order to improve the rapid dissolution of basically poorly soluble components, for example corresponding anionic surfactants, such as FAS, even at room temperature or only moderately elevated temperatures, it can be important to use so-called structure breakers which, in many cases, are extremely effective in only very small quantities, based on anionic surfactant.

A number of such dispersants or rather structure breakers are listed in the following subgroups (a) to (g). In addition, the general specialist knowledge of the expert on surfactants may be applied in this regard.

(a) Suitable structure breakers may be selected from a number of both solid and liquid substances which are hydrophilic, soluble in water or dispersible in water. Suitable structure breakers are, for example, lower polyalkylene glycols which are derived from linear or branched glycols containing 2 to 6 carbon atoms, preferably polyethylene glycol or polypropylene glycol, and which have a relative molecular weight of 200 to 12,000. Particularly preferred structure breakers are polyethylene glycols having a relative molecular weight of 200 to 4,000, liquid polyethylene glycols having a relative molecular weight of up to 2,000 and, more particularly, in the range from 200 to 600 showing particularly advantageous properties.

(b) The sulfates and, in particular, disulfates of lower polyalkylene glycols, more particularly polyethylene glycol and 1,2-propylene glycol, are also suitable. Sulfates and/or disulfates derived from polyethylene glycols and polypropylene glycols having a relative molecular weight of 600 to 6,000 and, more particularly, in the range from 1,000 to 4,000 are particularly preferred. The disulfates generally originate from polyglycol ethers which can be formed in the alkoxylation of alcoholic components through the presence of traces of water.

(c) Another group of suitable structure breakers consists of the water-soluble salts of mono- and/or disulfosuccinates of lower polyalkylene glycols. Of particular significance in this regard are the corresponding polyethylene glycol and polypropylene glycol compounds, sulfosuccinates and disulfosuccinates of polyglycol ethers having a relative molecular weight in the range from 600 to 6,000 and, more particularly, in the range from 1,000 to 4,000 being particularly preferred.

Salts and preferably alkali metal salts, more particularly sodium and potassium salts, and also ammonium salts and/or salts of organic amines, for example triethanolamine, are suitable for the use of the anionically modified polyalkylene glycols as structure breakers. The most important salts for practical application are the sodium salts of the sulfates, disulfates, sulfosuccinates and disulfosuccinates of polyethylene glycol and polypropylene glycol.

Mixtures of the polyalkylene glycols and their anionically modified derivatives in any ratio are also preferably used. A mixture of polyalkylene glycol and the sulfosuccinates and/or disulfosuccinates of the polyalkylene glycols is particularly preferred. However, a mixture of polyalkylene glycol and the corresponding sulfates and/or disulfates and a mixture of polyalkylene glycol and the corresponding sulfates and/or disulfates and also the corresponding sulfosuccinates and/or sulfodisuccinates are also suitable.

(d) Other suitable structure breakers preferably used in accordance with the invention are the adducts of approx. 20 to approx. 80 moles of ethylene oxide with 1 mole of an aliphatic alcohol essentially containing 8 to 20 carbon atoms which are well known ingredients of detergents and cleaning products. Of particular importance are the adducts of 20 to 60 moles and, more particularly, 25 to 45 moles of ethylene oxide with primary alcohols, such as for example coconut oil fatty alcohol or tallow fatty alcohol, with oleyl alcohol, with oxoalcohols or with secondary alcohols containing 8 to 18 and preferably 12 to 18 carbon atoms. Examples of particularly preferred structure breakers from the group of highly ethoxylated alcohols are tallow fatty alcohol containing 30 EO and tallow fatty alcohol containing 40 EO. It is also preferred to use mixtures containing highly ethoxylated alcohols, for example mixtures of tallow fatty alcohol containing 40 EO and water or mixtures of tallow fatty alcohol containing 40 EO and polyethylene glycol having a relative molecular weight of 200 to 2,000.

(e) Other suitable structure breakers are ethoxylated, vicinal internal alkanediols or 1,2-alkanediols with a carbon chain containing 8 to 18 carbon atoms and 4 to 15 moles of ethylene oxide per mole of diol. Only one of the two OH groups or both OH groups of the alkanediol can be ethoxylated.

(f) Other suitable structure breakers are modified nonionic surfactants terminated by an acid group. The nonionic surfactants in question are nonionic surfactants, more particularly fatty alcohols, in which one OH group has been converted into a group containing a carboxyl group. Accordingly, nonionic surfactants terminated by an acid group include esters or partial esters of a nonionic surfactant with a polycarboxylic acid or a polycarboxylic anhydride. Examples of acid-terminated nonionic surfactants are the known polyether carboxylic acids and esters or semiesters of $C_{8-18}$ alcohols with succinic anhydride, maleic anhydride, maleic acid or citric acid.

(g) Another group of suitable structure breakers consists of alkylene glycol monoalkyl ethers corresponding to the following general formula:

$$R^4O(CH_2CH_2O)_nH$$

in which $R^4$ is a radical containing 2 to 6 carbon atoms and n is a number of 1 to 8. Examples of this group of additives are ethylene glycol monoethyl ether and diethylene glycol monobutyl ether.

Particulars of possible embodiments of the superheated steam drying process can be found in applicants' earlier German patent applications as cited above, more particularly in German patent applications DE-A 42 04 035 and DE-A 42 04 090. To complete the disclosure of the present invention, a selection of particularly important process parameters from those earlier applications is discussed in the following:

The working conditions of the process according to the invention enable high temperatures to be used for the circulated steam phase in the drying step of the spray drying process. The working temperatures of the steam used are generally above 150° C. and preferably at least about 200° C. in the gas phase. Working temperatures of 250° C. and higher can be particularly interesting and even temperatures of at least 300° C. and more particularly in the range from 300° to 380° C. may be applied. In many cases, working temperatures in the range from about 270° to 350° C. in the steam phase are particularly suitable. All these temperature values relate to the temperature of the steam heated to optimal temperature which is delivered to the spray drying zone in co-current or countercurrent. The temperature of the steam falls in known manner during its contact with the wet or moist material. Considerations based largely on energy factors, including the intended subsequent use of the steam to be removed from the circuit, determine the quantitative ratios between the quantity of water to be evaporated and the quantity of superheated steam delivered. Embodiments which provide only for a limited reduction in the steam temperature after leaving the spray drying zone to values in the range from about 190° to 250° C. are possible in this regard whereas, in other embodiments, the thermal energy of the steam can advantageously be further utilized to reduce the temperature of the steam to the vicinity of the condensation temperature under process conditions (100° to 110° C.). More specifically, these details are determined inter alia by the design of the recycle process as a whole. Corresponding considerations apply to the use of superheated steam as the hot gas in an optional after treatment stage, for example using the fluidized bed process or any other optionally integrated agglomeration process. The figures mentioned above apply in this case also.

Basically, it may be said in respect of these considerations that the process is carried out in a closed-loop system with a steam circuit from which the water evaporated from the starting material is removed while the energy released in particular during the drying step is directly or preferably indirectly returned to the circuit. In one important embodiment, the steam removed is freed from entrained particles of material and put to another use as process steam, if desired after its pressure and temperature have been adapted to the required conditions. In another embodiment of the process according to the invention, the steam removed is at least partly condensed, for example for wet-washing the steam removed and freeing it from entrained particles of material. The liquid phase accumulating may be recycled to the drying process together with any of the useful material present therein. In this connection, it is possible, for example, to use vaporous fractions of the gas stream removed from the circuit to concentrate the washing liquid phase. The liquid recycled together with the useful material present therein may be directly delivered to the spray drying zone or may first be mixed with the fresh aqueous preparations and introduced in this form into the spray drying zone for drying.

In one particularly interesting embodiment of the invention, the heat of condensation of the steam removed from the circuit is recovered and utilized. By adopting suitable measures, it is even possible to recycle the small amounts of useful material which have left the primary steam circuit via the superheated steam removed therefrom. To this end, the following procedure, for example, may be adopted using the heat of condensation of the steam removed from the circuit:

Using the heat of condensation of the steam removed from the circuit, the steam condensate is concentrated in a preferably multiple-stage evaporation unit. The residual concentrate accumulating is returned to the primary process circuit. More particularly, this residual concentrate may be added to the slurry of useful material to be dried by superheated steam.

If necessary, a residual gas phase, if any, accumulating with minimal amounts of useful material during condensation of the superheated steam removed from the primary circuit may be subjected to subsequent working up during the condensation process, for example to incineration, treatment in biofilters or in washing units. By this combination of substantially complete recycling of the particular streams and the reliable destruction of final residual traces, the process according to the invention makes it possible for the first time in the industrial field with which the invention is concerned to recover useful materials and mixtures of useful materials from the field of detergents and cleaning products free from waste air and free from polluted wastewater.

Under the working conditions according to the invention, drying with the superheated steam may also be carried out on the one hand as spray drying and/or on the other hand as fluidized bed drying. Starting materials of comparatively high water content are present, for example, as flowable and sprayable aqueous solutions, emulsions and/or suspensions of the useful materials or mixtures of useful materials to be dried. In one important embodiment, starting materials of this type are subjected to spray drying technology known per se. The spray drying process may be carried out in co-current or in countercurrent in correspondingly equipped spray drying towers. In general, the countercurrent principle is also preferably applied in the process according to the invention using superheated steam as the hot drying gas.

Under the spray drying conditions, it is preferred in accordance with the invention indirectly to introduce the energy required for evaporation into the steam circuit at least predominantly outside the drying zone. This safeguards the result known from conventional spray drying that the fluid, wet starting material can be dried in fine particle form without the particles adhering significantly to one another or at least with controllable adjustment of the particle size. The energy introduced into the steam circuit outside the fluidized bed may be introduced in any known form of indirect heat transfer. The use of tube-bundle systems, through which heating gases of any origin on the one hand and—separately therefrom—the steam to be heated on the other hand flow, is mentioned as an example.

In one particularly important embodiment of the invention, this indirect introduction of energy into the steam circuit is carried out by one or more integrated burners with indirect transfer of heat to the steam, the hot combustion gases being directly introduced into the heat exchanger—integrated in the steam circuit—on the burner side. The temperature of the combustion gases may be, for example, in the range from about 400° to 1000° C. and, more particularly, is in the range from about 650° to 960° C. In the interests of optimal heat utilization and hence to reduce the costs of the process as a whole, it can be useful if the waste gases are also partly and, preferably, substantially completely circulated. For example, at least 30% by volume and preferably more than 40% by volume of the hot waste gases can be recirculated after leaving the integrated heat exchanger for the further utilization of energy. The quantity of waste gases recirculated preferably amounts to more than 60% by volume and often to around 70% by volume of the combustion gases introduced. The burner may be operated with any of the usual fuel gases, more particularly natural gas or comparable lower hydrocarbons or hydrocarbon mixtures and/or hydrogen.

If, on the other hand, the drying principle according to the invention is applied in fluidized bed drying, the necessary heating of the steam-based drying gas may be accomplished both outside the drying zone and with heat-exchanger elements integrated into the fluidized bed. These two gas heating mechanisms may also be combined with one another.

The preferred embodiment of the process according to the invention carried out at normal pressure provides for comparatively uncomplicated operation, even in industrial plants, with the necessary high throughputs per unit of time. The measure preferably applied in accordance with the invention of slightly elevating the internal pressure reliably prevents the unwanted entry of foreign gases, particularly air, into the steam-filled circuit. Secondary damage to the high product quality required can also thus be reliably prevented. Suitable working pressures are, for example, in the range up to about 0.15 bar, preferably up to about 0.075 bar and, more preferably, below 0.05 bar. The range from about 0.005 to 0.015 bar internal system pressure can be of particular advantage. Drying with superheated steam in accordance with the invention is of course also possible in principle at reduced pressures, particularly moderate reduced pressures, although in this case increased outlay on equipment is necessary for ensuring the absence of possible damaged areas in the circuit which could initiate the unwanted penetration of air. Accordingly, the figures mentioned above represent preferred reduced pressures.

The following Examples are intended to illustrate the invention without limiting it in any way.

EXAMPLES

EXAMPLE 1

In a pilot-plant-scale experimental spray-drying tower of the Niro-Atomizer "minor production" type, a slurry of the sodium salt of a $C_{16/18}$ α-sulfofatty acid having a dry matter content of 36.5% was converted into a surfactant powder having an apparent density of 370 g/l. The starting slurry had the following characteristic data:

Washing-active substance (Epton) 26.3%, based on slurry

Unsulfonated fatty acid 2.09%

Sodium sulfate 3.1%

Sodium chloride 2.2%

Degree of sulfonation 89.6%

The following operating parameters were adjusted:

Rotational speed of the rotating disk atomizer 25,000 r.p.m.

Steam entry temperature approx. 300° C.

Steam exit temperature approx. 200° C.

Reduced pressure in tower 16 mbar

Feed pump pressure 0.2 bar

Feed temperature 80° C.

Feed rate 8 kg per hour increased to 18 kg per hour during spray drying

Steam volume approx. 500 m³ per hour

The product obtained had a dry matter content of 99.8% and an apparent density of 370 g/l. It had very favorable dissolving properties when added to water.

EXAMPLE 2

The procedure was as in Example 1. The slurry to be dried was a slurry having a solids content of 36% which contained the above-mentioned sodium salt of a $C_{16/18}$ α-sulfofatty acid (with impurities) and polyethylene glycol, molecular weight 2,000, in a ratio by weight of the dry substances of 9:1. The tower entry temperature was 300° C. and the exit temperature 210° C. All other parameters were comparable. The product had a dry matter content of 99% by weight and an apparent density of 290 g/l.

EXAMPLE 3

In a pilot-plant-scale experimental spray-drying tower of the Niro-Atomizer "minor production" type, a slurry of the sodium salt of a $C_{16/18}$ fatty alcohol sulfate was converted into a free-flowing surfactant powder with addition of sodium carbonate. The mixing ratio between the anionic surfactant and the sodium carbonate was 4:1, based on dry matter.

The aqueous slurry of the fatty alcohol sulfate is a white to pale yellow, firm paste having the following characteristic data:

| | |
|---|---|
| Washing-active substance (Epton) | 54–58% by weight |
| Fatty alcohol sulfate | 53–55% by weight |
| Unsulfonated | 1–3% by weight |
| NaCl content | <= 1% by weight |
| $Na_2SO_4$ content | <= 2% by weight |
| pH value (3% aqueous preparation) | 10–11.5 |

After addition of the aqueous soda solution, a dry matter content of the slurry of 47.7% by weight was established.

The following operating parameters were adjusted for drying with superheated steam:

| | |
|---|---|
| Steam entry temperature | 250° C. |
| Steam exit temperature | 175–180° C. |
| Reduced pressure in tower | 16 mbar |
| Feed pump pressure | 5.5 bar |
| Feed temperature | 80° C. |
| Feed rate | 12 kg/h |
| Steam volume | approx. 350 m³/h |
| Propellant gas of the two-component nozzle | |
| quantity | 3.3 m³/h |
| pressure | 0.2 bar |

The product obtained had a dry matter content of 99.2% by weight and an apparent density of 293 g/l. 90% solubility in water at 20° C. was achieved after 40 seconds.

EXAMPLE 4

The procedure was as described in Example 3. The slurry to be dried had a solids content of 53.3% by weight and consisted of the sodium salt of a $C_{16/18}$ fatty alcohol sulfate mentioned in Example 1 and a fine-particle sodium aluminium silicate (detergent-quality zeolite NaA) in the form of a 48% suspension stabilized with 1.5% by weight of tallow alcohol polyglycol ether. The mixing ratio (dry weight) between anionic surfactant and silicate was 2:1. The dry product had an apparent density of 316 g/l and a solubility (90%) of 10 seconds.

EXAMPLE 5

The procedure was as described in Examples 3 and 4. A slurry having a solids content of 24.1% was dried in the superheated steam phase. The solid constituents of the starting mixture were the sodium salt of a $C_{16/18}$ fatty alcohol sulfate mentioned in Example 3, the disodium salt of a $C_{16/18}$ α-sulfofatty acid and sodium carbonate in a mixing ratio of 4:1:1. The dried carrier bead powder had an apparent density of 220 g/l and a solubility (90%) of 20 seconds.

EXAMPLE 6

Various mixtures of anionic surfactant components and water-soluble inorganic auxiliaries in the form of aqueous preparations are sprayed through a two-component nozzle (propellant gas nitrogen) as in Example 3 and dried in countercurrent with superheated steam.

The mixtures used, the mixing ratios of the components in the particular mixture (based on dry matter), the apparent densities in g/l obtained in the dry product, the residual moisture content in % by weight and the solubility (90%) under standard conditions in water (20° C.) are shown in the following Table. In this Table:

Sulfopon T55 (Henkel KGaA) is an anionic surfactant based on fatty alcohol sulfate, disalt is the Na disalt of a $C_{16/18}$ α-sulfofatty acid mixture, Dehydol TA40 is a tallow alcohol ethoxylate (on average 40 EO), waterglass A is water-soluble sodium silicate of detergent quality, APG stands for $C_{12/14}$ alkyl glucoside (DP approx. 1.4), ABS stands for washing-active alkyl benzenesulfonate (55% by weight aqueous paste).

Texapon N70 stands for $C_{12}$-$C_{14}$ fatty alcohol sulfate containing 2 moles ethylene oxide (68–73% by weight aqueous paste).

Sulfopon K35 stands for a lauryl alcohol sulfate (34–36% by weight aqueous paste).

Texin ES 68 stands for $C_{16}$-$C_{18}$ α-sulfofatty acid methylester and its salt (MES).

The following Table summarizes the cited data for mixtures of the type mentioned dried to formporous carrier beads. It can clearly be seen that the dissolving rates expressed as solubility (90%) are all comparatively high despite the presence in every case of considerable quantities of the anionic surfactant components which, basically, are poorly soluble in cold water in the particular mixture.

TABLE 1

| Composition | MR | AD g/l | RM % | L90 min/s |
|---|---|---|---|---|
| Sulfopon T55 + waterglass A | 50:50 | 267 | 1.46 | 1/01 |
| Sulfopon T55 + waterglass A | 70:30 | 209 | 1.52 | 0/27 |
| Sulfopon T55 + soda | 80:20 | 251 | 0.81 | 1/00 |
| Sulfopon T55 + soda | 90:10 | 285 | 4.02 | 2/14 |
| Disalt | — | 187 | 1.25 | 0/22 |
| Sulfopon T55 + disalt | 2:1 | 230 | 0.92 | 0/32 |
| Sulfopon T55 + disalt + soda | 4:1:1 | 220 | 1.07 | 0/20 |
| ABS + soda | 70:30 | 250 | 3.5 | 0/20 |
| ABS + soda | 50:50 | 258 | 4.6 | 0/16 |
| Sulfopon T55 + Texapon N70 + soda | 40:40:20 | 187 | 0.80 | 0/25 |
| Sulfopon K35 + soda | 70:30 | 221 | 0.77 | 0/12 |
| Sulfopon T55 + Sulfopon K35 + soda | 40:40:20 | 193 | 1.05 | 0/10 |
| Sulfopon T55 + Sulfopon K35 + soda + APG | 30:30:20:20 | 317 | 2.42 | 0/16 |
| Sulfopon T55 + Sulfopon K35 + soda | 54:26:20 | 225 | 1.12 | 0/23 |
| Sulfopon T55 + | 36:18:26:10 | 218 | 1.42 | 0/25 |

TABLE 1-continued

| Composition | MR | AD g/l | RM % | L90 min/s |
|---|---|---|---|---|
| APG + disalt + soda | | | | |
| Sulfopon T55 + APG + soda | 60:20:20 | 289 | 1.6 | 0/38 |
| Sulfopon T55 + Sulfopon K35 + APG + soda | 56:10:17:17 | 340 | 1.42 | 0/34 |
| Sulfopon K35 + soda | 90:10 | 258 | 0.7 | 0/10 |
| Sulfopon T55 + Texin ES68 + soda | 44:44:12 | 167 | 1.2 | 0/20 |
| Sulfopon T55 + soda | 70:30 | 198 | n.d. | 0/22 |
| Sulfopon T55 + soda + Dehydol TA40 | 70:20:10 | 218 | n.d. | 0/16 |
| Sulfopon T55 + soda + Dehydol TA40 | 75:20:5 | 143 | n.d. | 0/18 |
| Sulfopon T55 + disalt + APG | 50:48:2 | 354 | n.d. | 0/16 |

Legend:
MR = Mixing ratio (based on dry matter)
AD = Apparent density
RM = Residual moisture
L90 = Solubility (90%)
n.d. = Not determined

EXAMPLE 7

In a pilot-plant-scale experimental spray-drying tower of the Niro-Atomizer "minor production" type, a slurry of the sodium salt of a $C_{16/18}$ fatty alcohol sulfate was converted into a free-flowing surfactant powder with addition of sodium carbonate and sucrose. The mixing ratio between the anionic surfactant, the sodium carbonate and the sucrose was 80:17:3, based on dry matter.

The aqueous slurry of the fatty alcohol sulfate is a white to pale yellow, firm paste having the following characteristic data:

| | |
|---|---|
| Water-containing substance (Epton) | 54–58% |
| Fatty alcohol sulfate | 53–55% |
| Unsulfonated | 1–3% |
| NaCl content | ≦1% |
| $Na_2SO_4$ content | ≦2% |
| pH value (3% aqueous preparation) | 10–11.5 |

After addition of the aqueous soda and sucrose solutions, a dry matter content of the slurry of 47.7% by weight was established.

The following operating parameters were adjusted for drying with superheated steam:

| | |
|---|---|
| Steam entry temperature | 340° C. |
| Steam exit temperature | 160–180° C. |
| Reduced pressure in tower | 16 mbar |
| Feed pump pressure | 7.5 bar |
| Feed temperature | 80° C. |
| Feed rate | 21 kg/h |

| | |
|---|---|
| Steam volume | 350 m³/h |
| Propellant gas of the two-component nozzle | |
| quantity | 2.2 m³/h |
| pressure | 0.3 bar |

The product obtained was a white powder of neutral odor with a dry matter content of 99.2% by weight and an apparent density of 310 g/l. It showed very good wettability and favorable solubility in cold water.

EXAMPLE 8

The procedure was as in Example 7. The slurry to be dried was an aqueous preparation of the above-mentioned $C_{16/18}$ fatty alcohol sulfate, sodium carbonate, sucrose and polyethylene glycol having an average molecular weight of 400. The mixing ratio was 80:14:3:3, based on dry matter. The solids, sodium carbonate and sucrose, had been dissolved in 3 parts water and mixed with the slurry. The feed pump pressure was 4.3 to 4.6 bar and the quantity of propellant gas for the two-component nozzle was 3.8 m³/h; all other parameters were comparable with those of Example 7. The product had a dry matter content of 99.3% by weight and an apparent density of 280g/l and dissolves readily in water.

EXAMPLE 9

The procedure was as in Examples 7 and 8. The slurry to be dried was a slurry of the above-mentioned $C_{16/18}$ fatty alcohol sulfate, sodium carbonate, sucrose and a tallow fatty alcohol containing approx. 40 moles of EO. The mixing ratio was 80:14:3:3, based on dry matter. The sodium carbonate and the sucrose had been dissolved in water in a ratio of 1:3 before mixing with the slurry. The tallow fatty alcohol/$EO_{40}$ had been melted before its addition (melting point 42° to 47° C.). The feed pump pressure was 3.2 to 3.3 bar and the quantity of propellant gas for the two-component nozzle was 3.7 m³/h; all other parameters were comparable with those of Example 7. The product had a dry matter content of 99.2% by weight and an apparent density of 270 g/l. It is readily wettable with water and has a high dissolving rate.

We claim:

1. The process of producing artionic surfactant concentrates containing at least about 35% by weight of anionic surfactant in the form of solid, free-flowing powders or granules having an absorbent porous inner structure and an apparent density of from about 150 to about 370 g./l., comprising preparing aqueous solutions, emulsions or suspensions of said surfactant concentrates and drying said aqueous solutions, emulsions or suspensions of said surfactant concentrates with a drying medium consisting of superheated steam.

2. A process as in claim 1 wherein said aqueous solutions, emulsions or suspensions of said surfactant concentrates are not damaged by exposure to water or steam at temperatures of 100° C. to 110° C. for at least 0.5 to 1 minute.

3. A process as in claim 1 wherein said drying is carried out at a temperature of at least 200° C. as said drying gas.

4. A process as in claim 1 wherein said drying is carried out in a closed-loop system with a steam circuit from which the water evaporated from the starting material is removed while the energy released during the drying step is returned to the steam circuit.

5. A process as in claim 4 wherein said drying is conducted in co-current or counter-current manner with respect to said surfactant concentrates, the free-flowing dry material is removed from the steam circuit, and the steam removed from the steam circuit is cleaned to remove entrained particles of material therefrom and is then used as process steam or returned to the drying zone.

* * * * *